United States Patent
Komiyama et al.

(10) Patent No.: US 7,820,278 B2
(45) Date of Patent: Oct. 26, 2010

(54) REFRACTORY MORTAR CURED MATERIAL

(75) Inventors: Tsuneo Komiyama, Toki (JP); Osamu Yamakawa, Kani (JP); Tetsuhiro Honjo, Mizunami (JP); Akito Higuchi, Kani (JP)

(73) Assignees: NGK Insulators, Ltd., Nagoya (JP); NGK Adrec Co., Ltd., Kani-gun (JP)

( * ) Notice: Subject to any disclaimer, the term of this patent is extended or adjusted under 35 U.S.C. 154(b) by 199 days.

(21) Appl. No.: 12/034,970

(22) Filed: Feb. 21, 2008

(65) Prior Publication Data

US 2009/0169848 A1 Jul. 2, 2009

(30) Foreign Application Priority Data

Dec. 27, 2007 (JP) ............................. 2007-335620

(51) Int. Cl.
*B32B 3/26* (2006.01)
(52) U.S. Cl. .................. 428/219; 428/315.7; 501/95.2; 501/109; 501/120; 501/128; 501/133
(58) Field of Classification Search ................. 428/219, 428/315.7; 501/95.2, 109, 120, 121, 122, 501/128, 133
See application file for complete search history.

(56) References Cited

U.S. PATENT DOCUMENTS 7,112,233 B2 * 9/2006 Ohno et al. .................... 55/523

2002/0004445 A1 * 1/2002 Beall et al. .................... 501/119
2006/0101747 A1 * 5/2006 Masukawa et al. .......... 52/302.1
2006/0121240 A1 * 6/2006 Hirai et al. .................... 428/116

FOREIGN PATENT DOCUMENTS

JP 2004075524 A * 3/2004
JP 2004-231506 A1 8/2004

OTHER PUBLICATIONS

Machine English Translation of Suwabe_JP_2004/075524_A, "Manufacture of Ceramic Honeycomb Structure", Mar. 11, 2004, JPO, pp. 1-19.*

* cited by examiner

*Primary Examiner*—David R Sample
*Assistant Examiner*—Tahseen Khan
(74) *Attorney, Agent, or Firm*—Burr & Brown

(57) ABSTRACT

A refractory mortar cured material is formed in the surface or joint portions of a ceramic refractory material, such as fire bricks used in the lining of melting furnace or firing furnace used at high temperature, and includes ceramic particles with an inorganic binder having silanol group that are kneaded together with water. The kneaded mortar is applied on the surface of a ceramic base material. The average particle size of ceramic particles in the refractory mortar is 10 to 50 μm, and the difference between the 90% particle size and the 10% particle size is 10 μm or more to 60 μm or less. The average pore size of the refractory mortar cured material is 5 to 25 μm, and the width of pore size distribution is 20 to 80 μm, so that the cracks are suppressed. In addition, the bulk density is 0.9 to 1.5 g/cm$^3$.

5 Claims, 1 Drawing Sheet

REFRACTORY MORTAR CURED MATERIAL

BACKGROUND OF THE INVENTION

1. Field of the Invention

The present invention relates to a refractory mortar cured material applied on surface or joint portions of ceramic refractory materials such as fire bricks used in linings of melting furnace or firing furnace used at high temperature.

2. Description of the Related Art

On surface or joint portions of porous ceramic refractory material, refractory mortar cured materials are often formed for the purposes of enhancing the corrosion resistance or mechanical strength by isolating from the ambient atmosphere, adhering, and mending and the like. In such a case, since moisture is absorbed in the base material when the refractory mortar is applied on the base material surface or joint portions, a local shrinkage difference occurs in the refractory mortar cured material, and fine cracks may be generated. Besides, when the moisture is absorbed in the base material, the viscosity of the refractory mortar is raised, and the coating performance may be lowered.

To solve these problems, patent document 1 discloses a material containing powder and water having tap bulk density of 1.3 $g/cm^3$ or more and average particle size of 20 to 55 μm. The technology in patent document 1 is intended to suppress moisture absorption, and prevent crack or peeling of ceramic material by suppressing shrinkage difference.

Even by this technology in patent document 1, it is insufficient in depression of cracks occurring in initial period of forming the ceramic material or cracks occurring by heating after coating process, and it is not satisfactory from the viewpoint of thermal impact resistance. Generally, cracks are caused when the ceramic material is exposed to thermal stress during drying or heating process, but propagation of cracks may be blocked by pores existing in the texture. However, in the ceramic material in patent document 1, since cracks are not uniform in size and are localized, it is estimated that cracks may not be suppressed sufficiently.

[Patent document 1] Japanese Patent Application Laid-Open (JP-A) No. 2004-231506

SUMMARY OF THE INVENTION

Problems to be Solved by the Invention

It is hence a primary object of the invention to solve the problems of the prior art, and present a refractory mortar cured material enhanced in thermal impact resistance, by suppressing occurring in initial period of forming the refractory mortar cured material applied in the surface or joint portions of ceramic refractory material or cracks occurring by heating after coating process. It is other object of the invention to present a refractory mortar cured material advanced in corrosion preventive performance or protecting performance of ceramic refractory material.

Means for Solving the Problems

According to a first aspect of the present invention, a material formed by curing the refractory mortar applied on the surface or joint portions of a ceramic refractory material is provided, in which the average particle size of ceramic particles for composing the refractory mortar is 10 to 50 μm, the difference of 90% particle size and 10% particle size is 10 to 60 μm, the average pore size of the refractory mortar cured material is 5 to 25 μm, and the width of pore size distribution is 20 to 80 μm. Or, according to a second aspect, the bulk density of the refractory mortar cured material is preferably 0.9 to 1.5 $g/cm^3$.

According to a third aspect, the refractory mortar cured material is preferably composed by forming a kneaded mortar of ceramic particles and inorganic binder having silanol group together with water on the surface of a ceramic base material. Further, according to a fourth aspect, the ceramic base material is a porous ceramic, or, according to a fifth aspect, the ceramic base material and ceramic particles are both cordierite.

According to the invention, the average particle size of ceramic particles composing the refractory mortar cured material is 10 to 50 μm, the difference of 90% particle size and 10% particle size is 10 μm or more to 60 μm or less, and the particle size distribution of ceramic particles is controlled. Moreover, the average pore size of the formed refractory mortar cured material is 5 to 25 μm, and the width of pore size distribution is controlled at 20 μm or more to 80 μm or less. As a result, fluctuations of pore size of refractory mortar cured material are suppressed, and propagation of cracks can be effectively suppressed, and the refractory mortar cured material is excellent in durability and reliability is obtained. The particle size and its distribution of refractory mortar cured material may be obtained by image analysis using commercial analysis software.

DETAILED DESCRIPTION OF THE INVENTION

Figure 1:
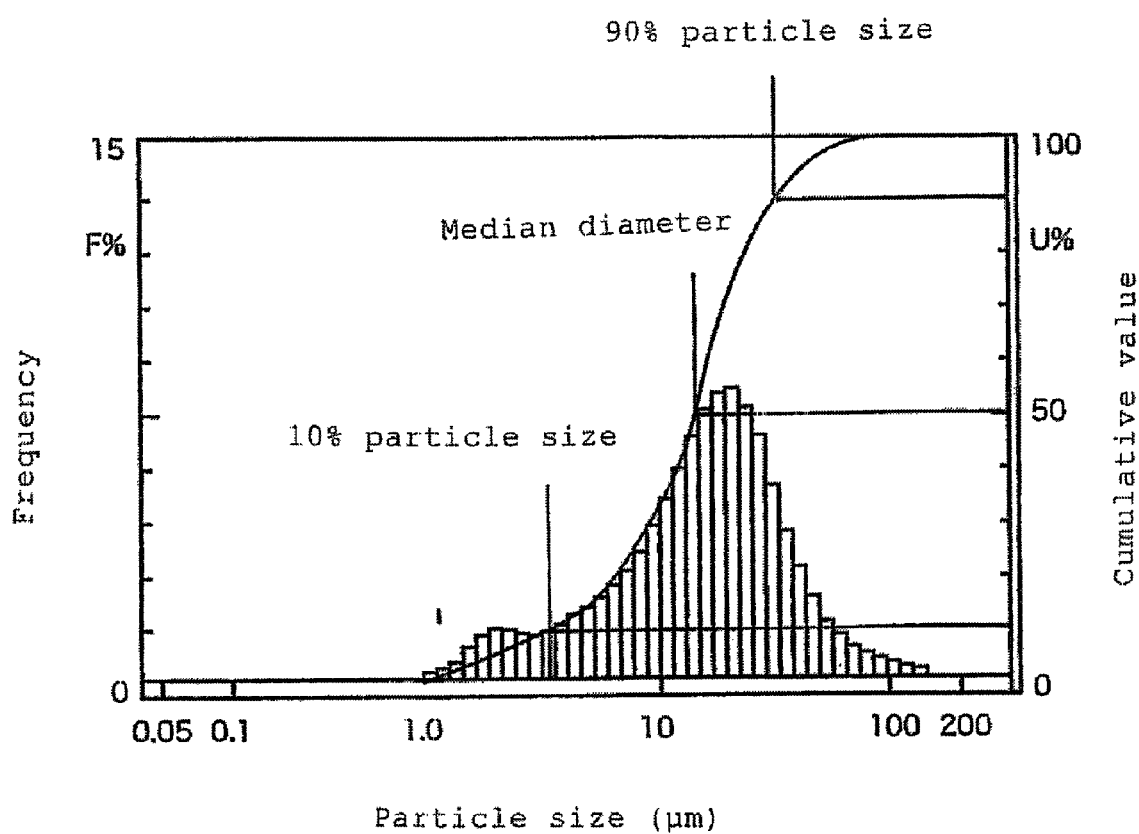
FIG. 1 is a graph of particle size distribution of ceramic particles.

A preferred embodiment of the invention is specifically described below.

The refractory mortar cured material of the invention is formed by applying a mortar material on the surface or joint portions of a ceramic refractory material. The ceramic refractory material is not particularly specified, but the ceramic refractory material is generally porous, and in the embodiment, it is used as part of refractory furnace material using fire bricks, or it maybe used for the purpose of protecting the surface of furnace wall bricks or enhancing the strength. Herein, being porous refers to a porosity of 20 to 70%.

The refractory mortar cured material of the invention is mainly composed of ceramic particles, and is formed by kneading water, and silica sol as an inorganic binder having a silanol group, and adjusting to a proper viscosity suitable for coating. As mentioned below, a small amount of ceramic fiber not exceeding 10%, about 0.1 to 0.2% of organic binder, and about 0.5 to 1.5% of claymineral maybe also added. Examples of organic binder include carboxyl methyl cellulose, methyl cellulose, polyethylene oxide, polyvinyl alcohol, urethane, and starch. The ceramic fiber contributes to the enhancement of the elasticity of the refractory mortar cured material, the suppression of cracks and the improvement of strength by a fiber extracting effect. The organic binder or clay provides a proper viscosity, improves uniform mixing and coating performance, enhances the binding force in a proper range, and is hence added for the purpose of enhancing the strength of refractory mortar cured material and improving the coating performance.

Ceramic particles include mullite, cordierite, alumina, silicon carbide, and others. The principal component of the refractory mortar cured material is preferably similar to ceramic refractory and is advantageous for suppressing the difference in thermal expansion, and in the case of refractory mortar cured material formed on the surface or joint portion of ceramic refractory material of mullite material, it is preferred to use mullite particles as ceramic particles, and it is preferred to use cordierite particles in the case of cordierite refractory material.

The particle size distribution of ceramic particles is generally a normal distribution or close to it, but when manufactured by an ordinary grinding method, the particle size is distributed in a wide range from 0.1 μm to hundreds of μm. However, when the mortar is mainly composed of such ceramic particles having such an ordinary particle size distribution, large pores may be formed near coarse particles of large particle size in the refractory mortar cured material, while small pores may be formed at the gathered portion of fine particles, and the fluctuations of pore size increases. As a result, portions where crack propagation is not sufficiently suppressed locally, and the thermal impact resistance of the refractory mortar cured material may be lowered.

In the present invention, the average particle size of ceramic particles composing the refractory mortar cured material is 10 to 50 μm, and the difference of 90% particle size and 10% particle size is 10 μm or more to 60 μm or less. The average particle size is the median diameter, and it is the particle size at which the cumulative value is 50% when the particle size distribution of ceramic particles is graphically expressed as shown in FIG. 1. If the average particle size is less than 10 μm, the shrinkage of the refractory mortar cured material is too much, and cracks may be formed, or if exceeding 50 μm, the pore size of refractory mortar cured material is increased, and propagation of cracks may be suppressed.

When the 50% particle size is in a range of 10 to 50 μm, and the particle size distribution is wide, the pore size of refractory mortar cured material fluctuates widely as mentioned above. In the invention, the difference of 90% particle size and 10% particle size is defined to be 10 μm or more to 60 μm or less. The 90% particle size refers to the particle size of which cumulative value is 90%, and the 10% particle size refers to the particle size of which cumulative value is 10%, which are shown in FIG. 1. This definition means that the particle size distribution is sharp, and when the difference of 90% particle size and 10% particle size exceeds 60 μm, the fluctuation of pore size becomes large. To the contrary, to control under 10 μm, special granulating process is needed, and it is not economical, and the particle filling rate is poor and the bulk specific gravity is lowered.

As mentioned above, in the invention, the average particle size of ceramic particles is 10 to 50 μm, and the difference of 90% particle size and 10% particle size is 10 μm or more to 60 μm or less, and by using such mortar, a refractory mortar cured material is formed, in which the average pore size of the refractory mortar cured material is 5 to 25 μm, and the width of pore size distribution is 20 μm or more to 80 μm or less. Preferably, the maximum pore size is not greater than 110 μm and the minimum pore size is not smaller than 0.5 μm. The pore size of the refractory mortar cured material may be measured at high precision by image processing using a commercial product of analysis software (for example, Image Pro-Plus manufactured by Media Cybernetics). In this image analysis, in one pore, the major diameter and minor diameter are measured, the mean value is calculated, and the diameter of the pore is obtained. All pores in the entire image are measured, and the mean pore size, minimum pore size, and maximum pore size are determined, and the balance of maximum pore size—minimum pore size is determined as the width of pore size distribution.

The refractory mortar cured material of the invention is, as described herein, effectively suppressed in propagation of cracks by reducing the fluctuation of pore size, and strictly suppressing the distribution of pore size and particle size so as to suppress the crack propagation to the fullest, and further, the bulk density of the refractory mortar cured material is defined at 0.9 to 1.5 g/cm$^3$, and this effect is further enhanced. The bulk density is measured according to JIS R 2655. If the bulk density is lower than this range, the strength is low and cracks are likely to be formed, or if larger than this range, the coefficient of thermal expansion increases, and cracks are also likely to be formed.

Thus, according to the invention, when the refractory mortar cured material is composed by using cordierite particles, the coefficient of thermal expansion is $1.5 \times 10^{-6}$ 1/K or less (up to 800° C., conforming to JIS R 2207), the four-point bending strength is 1 MPa to 7 MPa (conforming to JIS R 1601), and the thermal conductivity is 0.5 W/m·k or more (conforming to JIS R 1611), and local thermal stress is suppressed, and propagation of cracks may be effectively suppressed, and durability and reliability of the refractory mortar cured material is enhanced substantially as compared with the prior art.

EXAMPLES

Examples of the invention are described below.

Examples of refractory mortar shown in Table 1 were prepared, and the mortar was applied on the surface of ceramic refractory material of cordierite, and the refractory mortar cured material was formed, and the pore size was measured by image analysis. The characteristics were measured in these refractory mortar cured materials, and the results are shown in Table 1. The crack initiation temperature was evaluated by drying refractory mortar cured material pieces measuring 60×50×1 mm, at temperature of 40 to 110° C. for 8 hours or more, and each sample was taken out to room temperature from the environments which are heated to various temperatures, and the presence or absence of crack was visually checked, and the temperature at which a crack was observed first was determined as crack initiation temperature. Favorable results were obtained in the examples, and the crack initiation temperature was over 500° C.

By contrast, in comparative examples 1 and 2, the difference of 90% particle size and 10% particle size is over 60 μm, and the width of pore size distribution exceeds 80 μm, and the crack initiation temperature was under 450° C. In comparative example 3, the average particle size of ceramic particles is less than 10 μm, and the coating performance was poor, and the crack initiation temperature was very low at 350° C. In comparative example 4, the average particle size of ceramic particles is more than 50 μm, and the difference of 90% particle size and 10% particle size is over 60 μm. The average pore size was large. Hence, the coating performance was poor, and the crack initiation temperature was low at 400° C. In comparative example 5, the difference of 90% particle size and 10% particle size is less than 10 μm, and the difference of maximum pore size and minimum pore size is less than 20 μm. The bulk specific gravity is much lower. Hence the crack initiation temperature was low at 400° C.

Table 1

TABLE 1

| | Example 1 | Example 2 | Example 3 | Example 4 | Comparative example 1 | Comparative example 2 | Comparative example 3 | Example 5 |
|---|---|---|---|---|---|---|---|---|
| Cordierite powder (mass %) | 100 | 100 | 100 | 100 | 100 | 100 | 100 | 100 |
| Silica sol (mass %) | 30 | 30 | 30 | 30 | 30 | 28 | 32 | 32 |
| Ceramic fiber (mass %) | 5 | 5 | 5 | 5 | 5 | 7 | 5 | 5 |
| Clay mineral (mass %) | 1.0 | 1.0 | 1.0 | 1.0 | 0.5 | 1.5 | 1.0 | 1.0 |
| Organic binder (mass %) | 0.2 | 0.2 | 0.2 | 0.2 | 0.2 | 0.2 | 0.2 | 0.2 |
| Water (mass %) | 30 | 30 | 30 | 30 | 30 | 30 | 30 | 30 |
| Median diameter of cordierite powder (μm) | 20 | 20 | 20 | 20 | 20 | 20 | 8 | 10 |
| 90% particle size of cordierite powder (μm) | 50 | 45 | 57 | 65 | 69 | 80 | 39 | 40 |
| 10% particle size of cordierite powder (μm) | 4 | 5 | 5 | 5 | 5 | 3 | 1 | 1 |
| 90% particle size – 10% particle size (μm) | 46 | 40 | 52 | 60 | 64 | 77 | 38 | 39 |
| Average pore size (μm) | 11 | 10 | 11 | 12 | 13 | 15 | 4 | 5 |
| Maximum pore size (μm) | 46 | 40 | 63 | 80 | 87 | 101 | 23 | 24 |
| Minimum pore size (μm) | 3 | 3 | 3 | 3 | 3 | 3 | 0.5 | 0.5 |
| Maximum pore size – minimum pore size (μm) | 43 | 37 | 60 | 77 | 84 | 98 | 22.5 | 23.5 |
| Bulk specific gravity of mortar cured composition | 1.22 | 1.25 | 1.18 | 1.14 | 1.12 | 1.11 | 1.42 | 1.41 |
| Coefficient of thermal expansion ($\times 10^{-6}$ 1/K) | 1.5 | 1.5 | 1.5 | 1.5 | 1.5 | 1.5 | 2.0 | 2.0 |
| Four-point bending strength (MPa) | 1.3 | 1.5 | 1.2 | 1.1 | 1.0 | 0.9 | 6.0 | 4.5 |
| Thermal conductivity (W/m-k) | 0.5 | 0.5 | 0.5 | 0.5 | 0.6 | 0.6 | 0.8 | 0.8 |
| Viscosity (dPa·s) | 170 | 170 | 180 | 190 | 190 | 220 | 320 | 280 |
| Coating performance | ○ | ○ | ○ | ○ | ○ | ○ | Δ | ○ |
| Crack initiation temperature of mortar cured composition | 800 | 800 | 750 | 700 | 450 | 400 | 350 | 550 |

| | Example 6 | Example 7 | Comparative example 4 | Example 8 | Example 9 | Example 10 | Comparative example 5 |
|---|---|---|---|---|---|---|---|
| Cordierite powder (mass %) | 100 | 100 | 100 | 100 | 100 | 100 | 100 |
| Silica sol (mass %) | 30 | 30 | 30 | 30 | 30 | 30 | 30 |
| Ceramic fiber (mass %) | 0 | 5 | 5 | 0 | 0 | 0 | 0 |
| Clay mineral (mass %) | 1.0 | 1.0 | 1.0 | 1.0 | 1.0 | 1.0 | 1.0 |
| Organic binder (mass %) | 0.2 | 0.1 | 0.1 | 0.2 | 0.2 | 0.2 | 0.2 |
| Water (mass %) | 28 | 26 | 26 | 36 | 24 | 30 | 29 |
| Median diameter of cordierite powder (μm) | 30 | 50 | 55 | 30 | 30 | 30 | 29 |
| 90% particle size of cordierite powder (μm) | 67 | 88 | 110 | 67 | 67 | 36 | 31 |
| 10% particle size of cordierite powder (μm) | 11 | 33 | 34 | 11 | 11 | 23 | 23 |
| 90% particle size – 10% particle size (μm) | 56 | 55 | 76 | 56 | 56 | 13 | 8 |
| Average pore size (μm) | 17 | 24 | 28 | 17 | 17 | 20 | 19 |
| Maximum pore size (μm) | 85 | 110 | 118 | 85 | 85 | 45 | 37 |
| Minimum pore size (μm) | 12 | 30 | 36 | 12 | 12 | 18 | 20 |
| Maximum pore size – minimum pore size (μm) | 73 | 80 | 82 | 73 | 73 | 27 | 17 |
| Bulk specific gravity of mortar cured composition | 1.38 | 1.24 | 1.21 | 0.88 | 1.53 | 0.90 | 0.80 |
| Coefficient of thermal expansion ($\times 10^{-6}$ 1/K) | 1.3 | 1.2 | 1.2 | 1.2 | 1.7 | 1.2 | 1.2 |
| Four-point bending strength (MPa) | 5.7 | 1.3 | 1.3 | 0.8 | 7.0 | 0.8 | 0.8 |
| Thermal conductivity (W/m-k) | 0.7 | 0.7 | 0.7 | 0.4 | 1.2 | 0.4 | 0.4 |
| Viscosity (dPa·s) | 170 | 100 | 60 | 60 | 320 | 150 | 170 |
| Coating performance | ○ | ○ | Δ | Δ | Δ | ○ | ○ |
| Crack initiation temperature of mortar cured composition | 700 | 650 | 400 | 550 | 500 | 500 | 400 |

The number of cracks of coated wall was evaluated by drying coated wall pieces measuring 60 × 50 × 1 mm, at temperature of 40 to 110° C. for 8 hours or more, and each sample was taken out to room temperature from the environments which are heated to various temperatures, and the presence or absence of crack was visually checked, and the temperature at which a crack was observed was determined as crack initiation temperature.

700° C. or higher   ○ (Satisfactory)
500 to 700° C.   Δ (Acceptable)
Less than 500° C.   X (Unacceptable)

The invention claimed is:

1. A refractory mortar cured material, formed by curing refractory mortar, applied on the surface or joint portions of a ceramic refractory base material, the refractory mortar cured material consisting of cordierite ceramic particles having an average particle size of 10 to 50 μm in an amount of 100 mass %, an organic binder in an amount of 0.1-0.2 mass %, silica sol in an amount of 30 mass %, and ceramic fibers in an amount of less than 5 mass %; wherein a difference between a 90% particle size and a 10% particle size of the cordierite ceramic particles is 10 to 60 μm, wherein an average pore size of the refractory mortar cured material is 5 to 25 μm, and wherein a width of a pore size distribution of the refractory mortar cured material is 20 to 80 μm.

2. The refractory mortar cured material of claim 1, wherein a bulk density of the refractory mortar cured material is 0.9 to 1.5 g/cm$^3$.

3. The refractory mortar cured material of claim 1, wherein the cordierite ceramic particles are kneaded with the silica sol, as an inorganic binder having a silanol group, together with water to form a kneaded mortar, and the kneaded mortar is formed on a surface of the ceramic refractory base material.

4. The refractory mortar cured material of claim 1, wherein the ceramic refractory base material is a porous ceramic.

5. The refractory mortar cured material of claim 1, wherein the ceramic refractory base material is cordierite.

* * * * *